United States Patent [19]

Haines

[11] 4,183,623
[45] Jan. 15, 1980

[54] TOMOGRAPHIC CROSS-SECTIONAL IMAGING USING INCOHERENT OPTICAL PROCESSING

[76] Inventor: Kenneth A. Haines, General Delivery, Silverado Canyon, Calif. 92676

[21] Appl. No.: 840,995

[22] Filed: Oct. 11, 1977

[51] Int. Cl.$^2$ .................... G02B 27/38; G03B 41/16
[52] U.S. Cl. ............................ 350/162 SF; 250/323; 250/445 T
[58] Field of Search ............... 350/162 SF, 162 ZP, 350/205; 250/445 T, 320, 323; 356/71

[56] References Cited

PUBLICATIONS

Bates et al., New Zealand Journal of Science, vol. 14, No. 4, Dec. 1971, pp. 883–896.
Katyl, Applied Optics, vol. 11, No. 5, May 1972, pp. 1255–1260.
Lohmann et al., Applied Optics, vol. 10, No. 3, Mar. 1971, pp. 670–672.

Primary Examiner—Ronald J. Stern
Attorney, Agent, or Firm—Limbach, Limbach & Sutton

[57] ABSTRACT

A method of constructing cross-section images similar to "computer assisted tomography," using optical data processing to replace the computer. The method uses incoherent light in the optical processor, thereby avoiding the noise and diffraction patterns inherent in images processed with coherent light. The method disclosed in this invention allows the processing to be carried out in real-time as the data are being collected.

5 Claims, 8 Drawing Figures

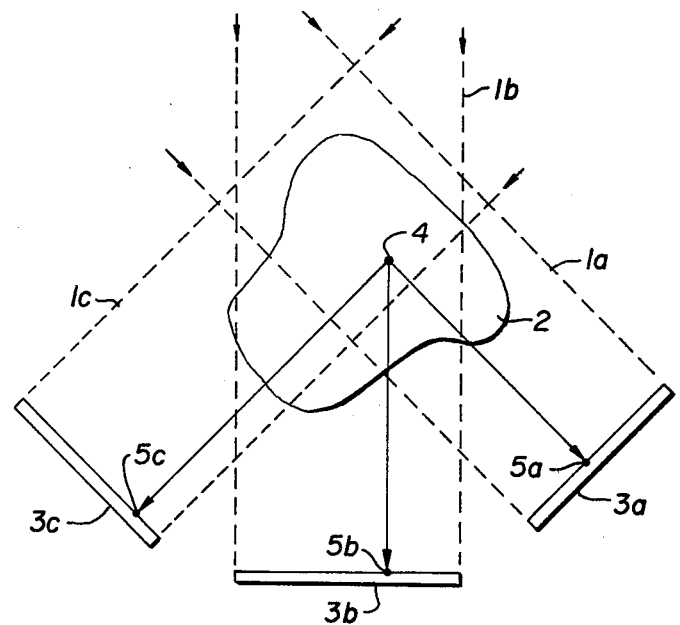
FIG._1.
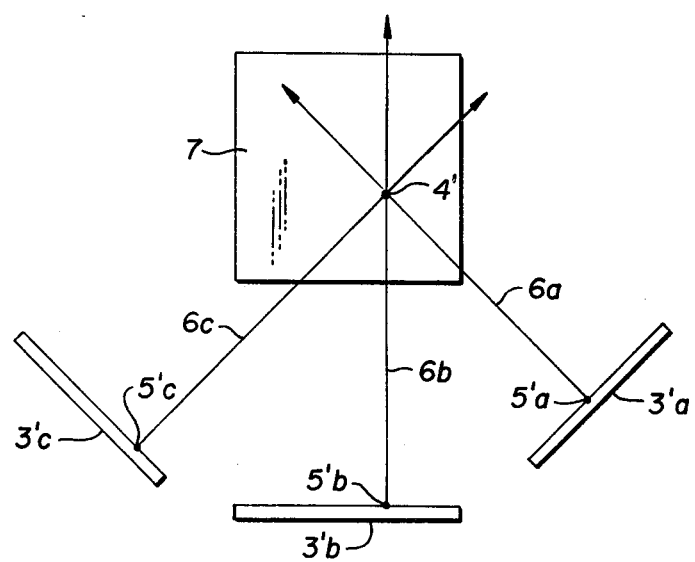
FIG._2.

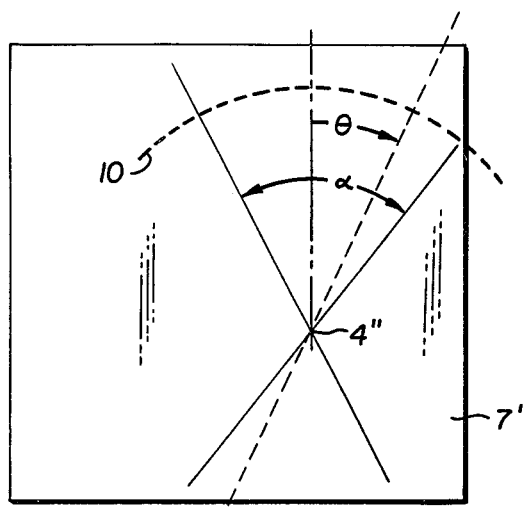
FIG._3a.
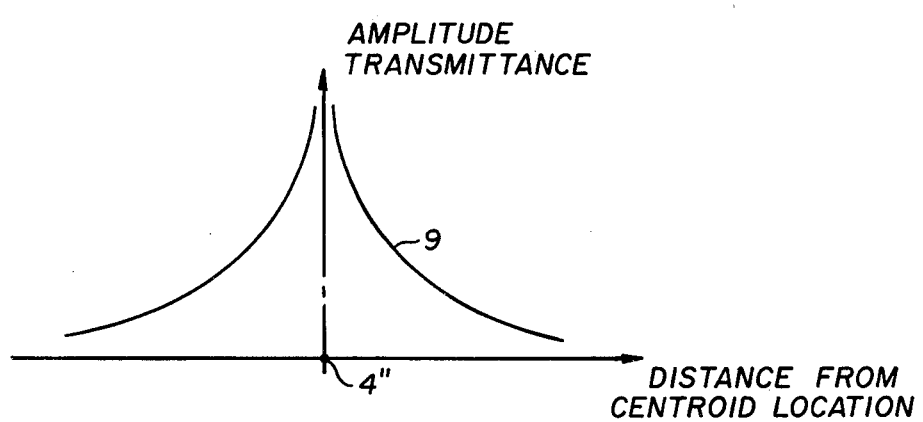
FIG._3b.
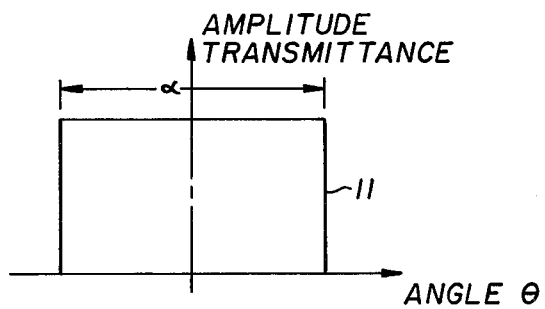
FIG._3c.

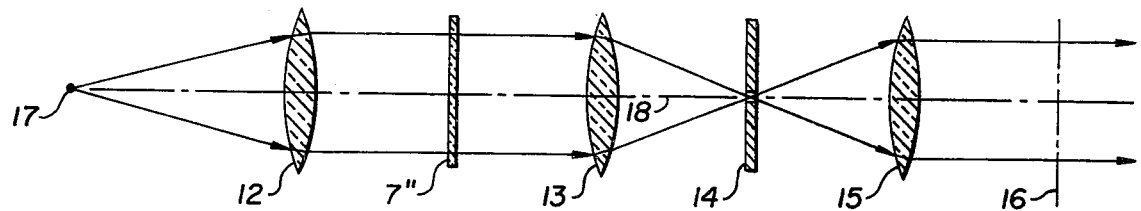
FIG._4.
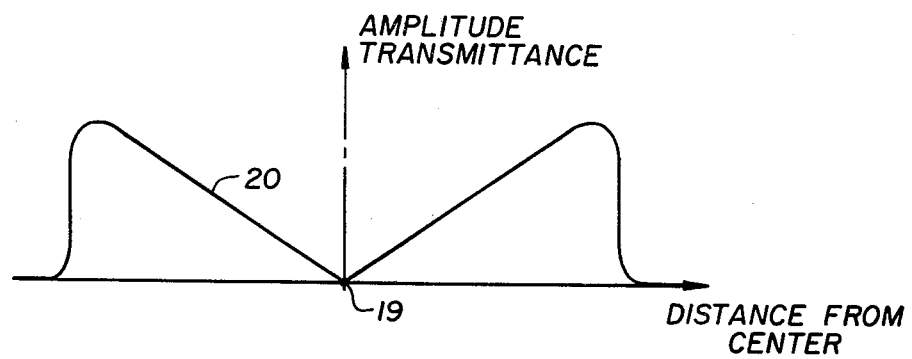
FIG._5.
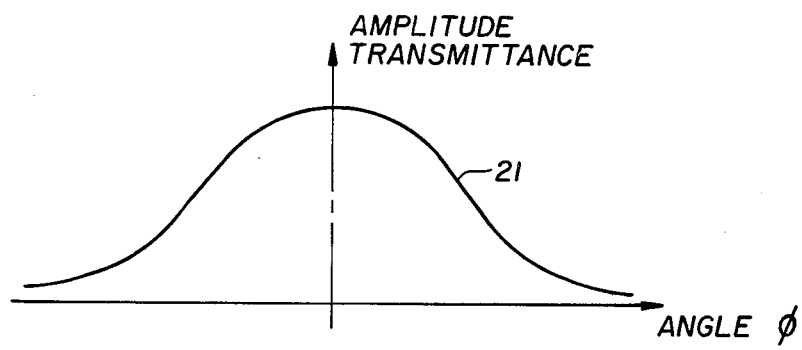
FIG._6.

TOMOGRAPHIC CROSS-SECTIONAL IMAGING USING INCOHERENT OPTICAL PROCESSING

BACKGROUND OF THE INVENTION

This invention resides generally in the field of tomography and is specifically directed to a method of producing transaxial cross-sections with incoherent optical processing.

BRIEF DESCRIPTION OF PRIOR ART

Conventional X-ray images of the human anatomy are simple shadowgrams, providing very little cross-sectional information. One method which has been used by radiographers for a number of years to obtain cross-sectional images is commonly referred to as tomography. Recently this term has come to embrace other cross-sectional imaging devices such as those in radionucleid and ultrasonic fields.

In one common embodiment of tomography, the X-ray source and the film are moved relative to each other in such a way that the shadows of points in a single plane of the body are steadily projected onto the same place on the film. Shadows of other parts of the body move in relation to the film. Thus, while the section of interest is registered sharply, the picture is overlayed by the motion-blurred images from other parts of the body. The net result is that the tomogram lacks contrast, and fine detail is obscured. This fundamental problem is due in part to the fact that X-rays traverse parts of the body which are of no interest, as well as the plane being studied.

More recently laminar beams which are essentially radiation sheets, are made to impinge on the body normal to its axis, thus irradiating only the plane of interest. By illuminating the body from a multiplicity of angles within the plane, and by using a computer to sort out the detail from the shadowgrams so obtaining, cross-sectional images can be reconstructed. These instruments are commonly referred to as CAT (Computer Assisted Tomographic) scanners. One such instrument which has been marketed throughout the world is the result of the pioneering work of G. N. Housefield of the EMI Corporation in Great Britain. The use of these devices requires that the irradiation be passed through the body over a variety of angles within the plane of interest extending from 0° to 180°, and further that data from all of these angles be acquired before a single image point is computed. With the majority of existing X-ray machines, neither the heads of the machines nor the specimens under observation can be rotated through this large an angle. A more detailed discussion of the CAT scanner system is given in an article authored by Housefield in the British Journal of Radiology, Number 46, page 1016 (1973), as well as in the patent titled "A method of an apparatus for examination of a body by radiation such as X or gamma radiation," which is filed as Patent Specification 1283915 in the Patent Office, London, England, in 1972.

A related technique has been reported which uses a coherent optical data processing system to sort out the cross-sectional image and which avoids the necessity of a computer. With that method, a back-projection transparency (layergram) is constructed from multiple shadowgrams which are similar to the shadowgrams obtained with the CAT scanners. This transparency is then used as the object transparency in a conventional Fourier transforming coherent optical processor. The processor output is essentially a two-dimensional image similar to the desired cross-section. A more detailed description of this optical process is available in an article authored by H. C. Becker, P. H. Myers, and C. M. Nice in 1968, titled "Laser Light Diffraction, Spatial Filtering and Reconstruction of Medical Radiographic Images. A Pilot Study," published in the Transactions of the Institute of Electrical and Electronic Engineers, Bio-Medical Engineering 15, pages 186 through 195. The image quality of these devices is generally limited by those factors which are inherent to coherent optical processors. Light scattered from particles in the object plane (film grains in the case of photographic film) generates a granular noisy background in the image plane. Overlaying diffraction patterns from unavoidable dust particles on lenses and other components also contribute to the noise-like structure. Undesirable patterns from component edges and the spatial filter itself further contaminate the image.

It is an object of this invention to achieve good cross-sectional imaging using data acquired from only a limited range of angles.

It is another object of this invention to use incoherent optical processing to create these images.

It is a further object of this invention to construct cross-sectional images of objects in essentially real-time as they are being scanned.

SUMMARY OF THE INVENTION

The objects of this invention are accomplished by using a point source of incoherent illumination as the source in an optical Fourier transformation lens system. The spatial filter is either a filter in which the transmittance varies linearly with respect to radial distance from its center, or inversely with respect to this radial distance, depending on whether image restoration or correlation is desired. The angular variation about the central point of the filter can be complex and is chosen to improve the image quality.

While the present invention is defined in the appended claims, the underlying principles of the invention, together with specific embodiments thereof, may be better understood with the reference to the following detailed description taken in conjunction with the following drawings.

BRIEF DESCRIPTION OF THE DRAWINGS

FIG. 1 depicts the method of conventional CAT scanning;

FIG. 2 depicts a hypothetical method of back-projection transparency construction;

FIG. 3a shows a back-projection transparency;

FIG. 3b shows the transmittance for a section through an image point centroid in the back-projection for a single point object;

FIG. 3c shows a preferred embodiment of the angular variation in a back-projection transparency;

FIG. 4 illustrates a generalized optical data processing system;

FIG. 5 shows a preferred radial variation of transmittance for a spatial filter used in the system of FIG. 4; and FIG. 6 shows a preferred angular variation of transmittance for a spatial filter used in the system of FIG. 4.

DETAILED DESCRIPTION OF PREFERRED EMBODIMENTS

Referring to FIG. 1, a basic method of transaxial tomographic scanning is illustrated in which the radiation beam 1 traversing the object plane of interest 2 is shown in three of its many angular positions 1a, 1b and 1c. The detector line array 3 is shown in the corresponding three positions 3a, 3b and 3c, where it can intercept each ray transmitted through the object plane 2. Also shown in the figure is a single object point 4. The ray which is transmitted through the object point 4 impinges on the detector at each of its three orientations 3a, 3b and 3c, at the locations 5a, 5b and 5c where it is subsequently detected.

FIG. 2 shows how a back-projection transparency is related to the intensity of the rays detected with the system of FIG. 1. The detector array is shown in the three positions 3'a, 3'b and 3'c, which are equivalent to the three positions which it occupied in FIG. 1, namely 3a, 3b and 3c. Also shown are the three detector elements which were stimulated by the point object 4 in the detection process of FIG. 1. These points are 5'a, 5'b and 5'c. If one were to project lines 6a, 6b and 6c back across the object plane, each line originating from the corresponding detector point 5'a, 5'b or 5'c, and passing through the point 4' originally occupied by the object, thus preserving the original ray angles, and if the density of each line so placed on the otherwise transparent surface 7 was related to the detected intensity at each detector point, he would be constructing a transparency through which the transmissivity would be roughly that desired for a back-projection transparency (layergram). In order to construct the back-projection transparency accurately, it is necessary to back-project rays for many angles of orientation and not just the three shown in FIG. 1 and FIG. 2.

Referring to FIG. 3a, if this ray tracing across the back-projection plane 7' for this single object point example is carried out over the continuous range of angle $\alpha$, and if the amplitude transmittance through each back-projected line is proportional to the logarithm of the intensity of the detected X-ray beam, then a typical section 8 through the centroid 4" of this back-projection transparency 7' would have an amplitude transmittance function similar to the curve 9 shown in FIG. 3b. This function varies at 1/r, where r is the radial distance from the centroid 4". The amplitude transmittance of a line through the circumference 10 of FIG. 3a would be a uniform function 11 similar to that shown in FIG. 3c, if the X-ray irradiation were held constant as the illumination angle was swept uniformly through the angle $\alpha$. The general transmittance function for the back-projection transparency 7 can be represented in polar coordinates as the function $g(\theta)/r$, where the angle function $g(\theta)$ is a general function which depends on the variation in X-ray irradiation intensity with angle scanning during the process. With CAT systems, this function $g(\theta)$, must be uniform throughout $2\pi$ radians, i.e., a total of 180° must be uniformly scanned. Usually in practice, an object cross-section will contain many object points, and this will result in a back-projection transparency containing many overlapping and spatially separated functions similar to that of FIG. 3b and FIG. 3c.

Referring to FIG. 4, in one embodiment of an optical data processing system, the back-projection transparency 7" is inserted between the collinating lens 12 and the Fourier transforming lens 13. The Fourier transform of the transparency 7" is constructed as the amplitude transmission through the plane containing the spatial filter 14, if the light source 17 radiates coherent light, as from a laser. The lens 15 creates at the plane 16 an image of the transparency 7". The scaling of the Fourier transform created at the plane of the spatial filter 14 is linearly dependent on the wavelength of the radiation generated by the source 17. Generally this means that incoherent light cannot be used.

A system using an incoherent source 17, similar to that shown in FIG. 4, can be used for some types of back-projection processing for the following reason. It can be shown that the back-projection transparency function, $g(\theta)/r$, has as its Fourier transform the function $$-g(\phi+\pi/2)/2\pi\rho$$

where $\rho$ and $\phi$ are the polar coordinates in the Fourier plane, if the function $g(\phi)$ contains only Fourier components of even integral order, i.e., if the function is periodic in $\pi$ radians rather than $2\pi$. The amplitude transmittance in the Fourier plane occupied by the spatial filter 14 is identical to the amplitude transmittance of the back-projection transparency itself, except that it is rotated about the optical axis through 90 degrees, and is modified by an inconsequential factor of $2\pi$. Both the back-projection transparency and its Fourier transform are scale invariant. That is, a change in scale of both coordinates within the plane alters the function only by a constant multiplier. This means that incoherent or white light can be used as the source 17. Furthermore if the spatial filter function 14 is itself scale invariant, then an optically processed cross-sectional image will be constructed at plane 16 even though an incoherent source 17 is used. The system of FIG. 4 utilizes more lenses than are actually required. Optical Fourier transforming and imaging systems using fewer lenses are applicable.

Referring to FIG. 5, a preferred embodiment of a spatial filter which is scale invariant is one in which the amplitude transmittance varies linearly with distance from its central point 19 on the optical axis 18, over a substantial aperture. A section through the central point of such a filter will have amplitude transmittance similar to that of curve 20 in FIG. 5. A filter with this amplitude transmittance will, in the absence of noise, allow an image to be created in the image plane 16 of the processor, which bears a close resemblance to the desired cross-sectional image.

Another embodiment of a spatial filter which is scale invariant is one in which the amplitude transmittance varies inversely with the distance from its central point on the optical axis. A section through the central point of such a filter will have amplitude transmittance similar to 9 of FIG. 3b when the point 4" in FIG. 3b is assumed to be located at the central point on the optical axis 18 of FIG. 4. Such a filter leads to the creation in the plane 16 of FIG. 4 of an image in which each point is the autocorrelation of the function 9 of FIG. 3b. In the presence of certain types of noise, it will give good quality cross-sectional imaging.

The two filter functions presented here are not the only scale invariant functions. Other examples are the dirac-delta function and the uniform function. However, the functions of FIG. 3b and FIG. 5 are useful for creating quality images. No restriction is placed upon the angular variation of the filter. That is, g(φ) can be any realizable function provided it is periodic in π radians. The selection of function g(φ) will, however, affect the resulting cross-sectional image in plane 16 of FIG. 4. The uniform function, such as that shown for the back-projection transparency of FIG. 3c, may not be the most ideal since sharp undesirable radial lines are created about each point in the image when it is used. An alternative embodiment is one in which this angular variation is the Gaussian shape 21 shown in FIG. 6. Other possibilities, including those which are periodic, also exist.

In a preferred embodiment of the present invention, the spatial filter is constructed to accommodate the maximum range of angles in the back-projection transparency, such as the range α for the transparency 7' of FIG. 3a. The back-projection transparency is constructed in situ in position 7" of FIG. 4 so that the processing is carried out continuously even though data from only a small range of angle θ is collected initially. In this way the processing can be carried out essentially in real time as the object is being interrogated by the X-rays. In another embodiment, a more complex filter may be modified in situ so as to accommodate a varying range of angles α, thus providing the same real time capability.

While the invention has been described in somewhat general terms without reference to a specific detailed and complicated mathematical analysis, and while the invention has been illustrated in specific embodiments, it is not intended that the invention be limited to the specific embodiments illustrated. It is also considered desirable that the mathematical analysis be eliminated, inasmuch as it adds nothing to the understanding of the basic principles underlying this invention and may tend to confuse those not intimately familiar with mathematics on the level required for such an analysis.

I claim:

1. A method of constructing cross-sectional images from tomographic back-projection transparencies (layergrams), comprising the steps of:
    providing a substantially point source of temporally incoherent (polychromatic) radiation, thereby to provide a beam of radiation emanating from said point,
    placing a Fourier Transforming lens in the path of said beam of radiation in such a manner that the substantially point source is caused to come to focus in a Fourier plane,
    constructing a back-projection transparency,
    placing said back-projection transparency on either side of the aforementioned lens such that an essentially Fourier Transform of said back-projection transparency is formed in the Fourier plane,
    constructing a spatial filter transparency which is scale invariant, except for a constant multiplier,
    placing said spatial filter transparency in the Fourier plane, and
    producing an image of said spatial filtered back-projection transparency which is a cross-sectional image.

2. The method as defined in claim 1 wherein said spatial filter transparency has an amplitude transmittance which varies substantially linearly as a function of radial distance from its center over a substantial aperture.

3. The method as defined in claim 1 wherein said spatial filter transparency has an amplitude transmittance which varies substantially inversely as a function of radial distance from its center over a substantial aperture.

4. A method according to claim 1 in which the source illuminating the back-projection transparency is a white light incoherent substantially point source.

5. A method according to claim 1 wherein said back-projection transparency is constructed in situ and substantially in real time as the data are being generated from an X-ray tomographic device.

* * * * *